No. 12,792.
REISSUED MAY 12, 1908.
C. F. TAYLOR & G. M. McCLELLAN.
PAPER RULING MACHINE.
APPLICATION FILED APR. 16, 1907.
3 SHEETS—SHEET 1.
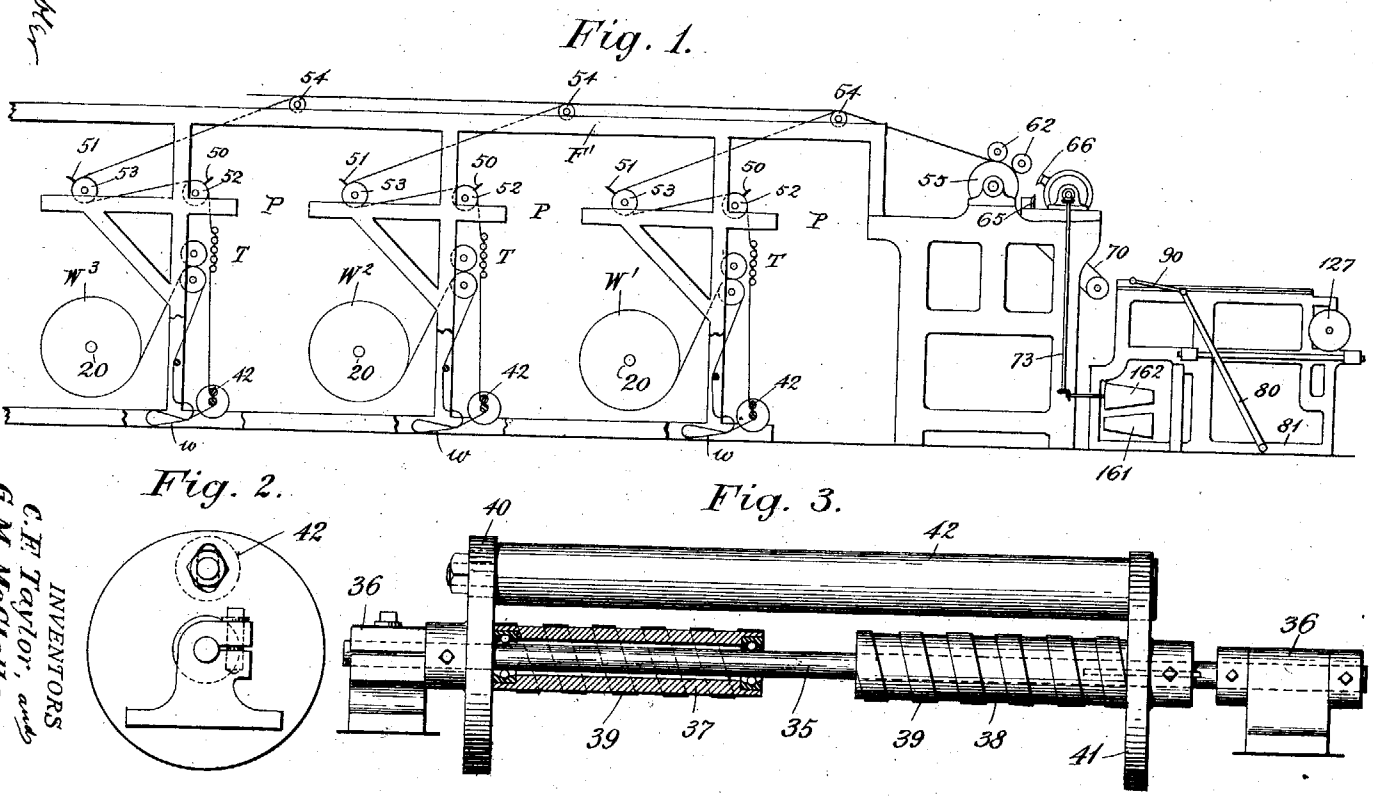
WITNESSES:
John F. Doebler
A. M. Darton
INVENTORS
C. F. Taylor, and
G. M. McClellan,
BY Charles Francis Schmelz
ATTORNEY.
THE NORRIS PETERS CO., WASHINGTON, D. C.

No. 12,792. REISSUED MAY 12, 1908.
C. F. TAYLOR & G. M. McCLELLAN.
PAPER RULING MACHINE.
APPLICATION FILED APR. 16, 1907.
3 SHEETS—SHEET 2.
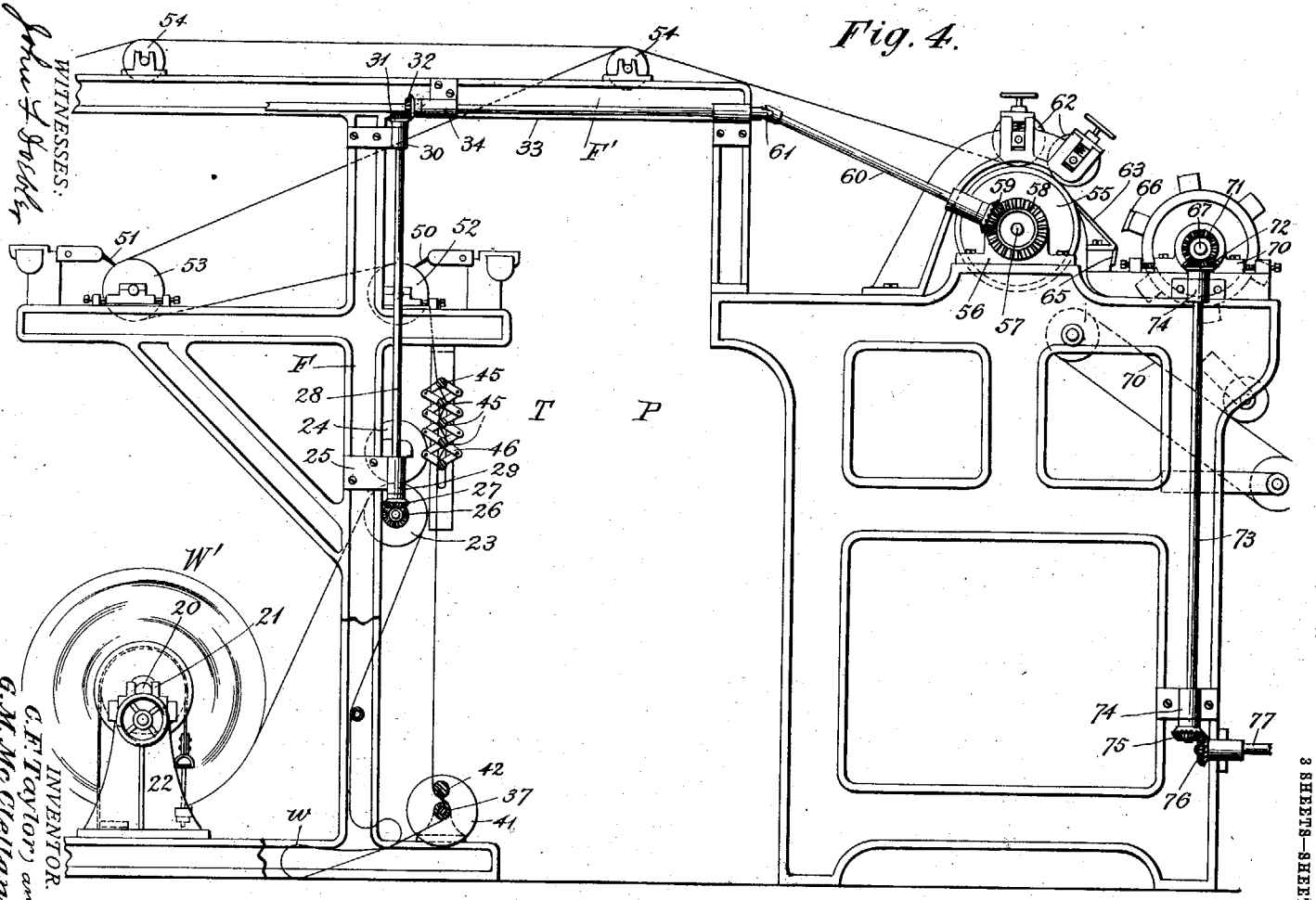
WITNESSES:
John F. Doebler
A. W. Barton,
INVENTOR.
C. F. Taylor, and
G. M. McClellan,
BY
Chas Francis Schuetz
ATTORNEY.
THE NORRIS PETERS CO., WASHINGTON, D. C.

No. 12,792. REISSUED MAY 12, 1908.
C. F. TAYLOR & G. M. McCLELLAN.
PAPER RULING MACHINE.
APPLICATION FILED APR. 16, 1907.
3 SHEETS—SHEET 3.
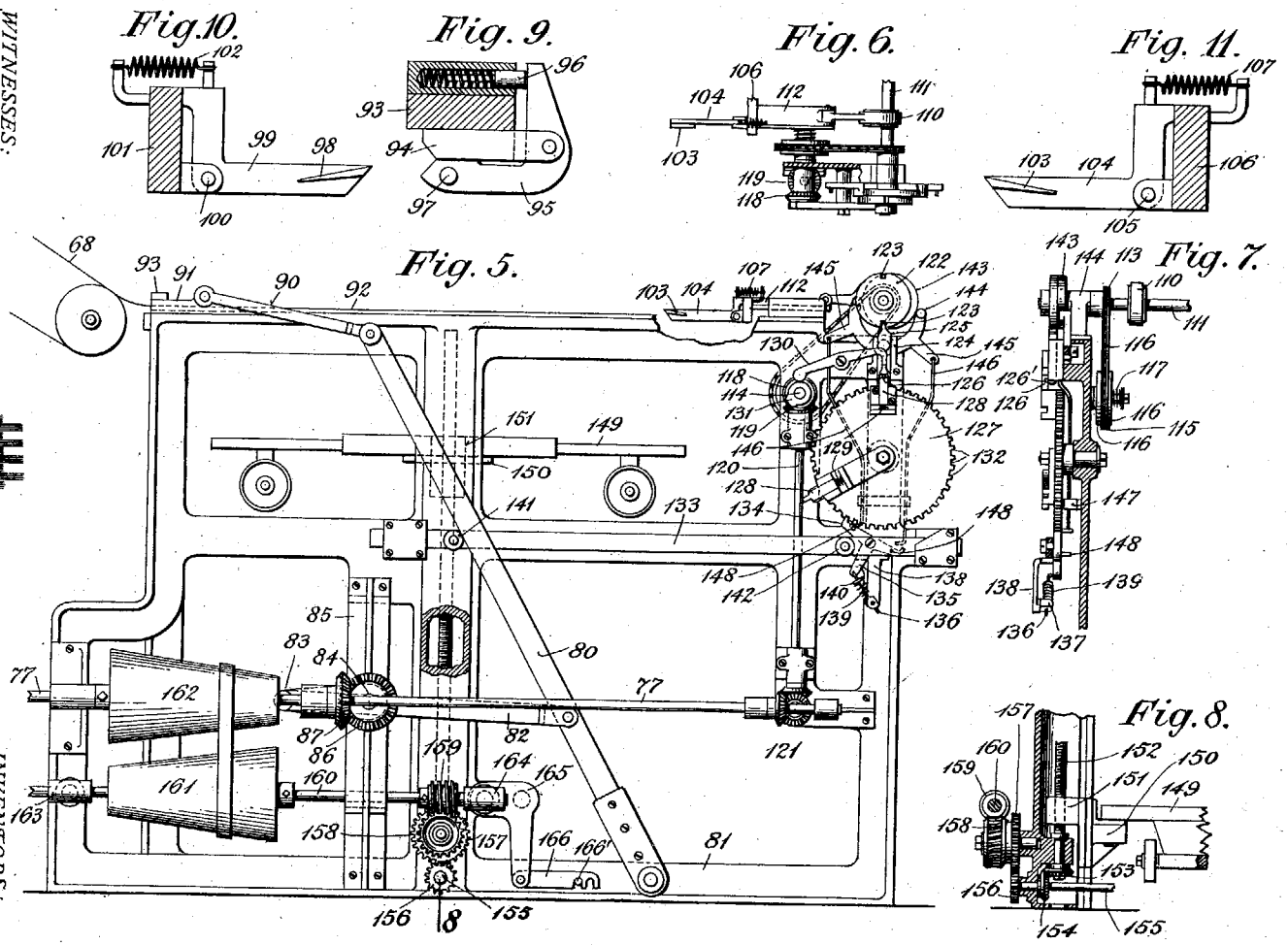
WITNESSES:
John F. Doebler
A. W. Dalton
INVENTORS:
C. F. Taylor and
G. M. McClellan,
BY Chas. F. Schmelz
ATTORNEY.
THE NORRIS PETERS CO., WASHINGTON, D. C.

UNITED STATES PATENT OFFICE.

CHARLES F. TAYLOR, OF HARTFORD, AND GEORGE M. McCLELLAN, OF EAST HARTFORD, CONNECTICUT; SAID McCLELLAN ASSIGNOR, BY MESNE ASSIGNMENTS, TO FREDERICK C. ATKINS, OF HARTFORD, CONNECTICUT.

PAPER-RULING MACHINE.

No. 12,792. Specification of Reissued Letters Patent. Reissued May 12, 1908.

Original No. 764,643, dated July 12, 1904, Serial No. 166,179. Application for reissue filed April 16, 1907. Serial No. 368,610.

*To all whom it may concern:*

Be it known that we, CHARLES F. TAYLOR and GEORGE M. McCLELLAN, citizens of the United States, and residents, respectively, of Hartford and East Hartford, in the county of Hartford and State of Connecticut, have invented certain new and useful Improvements in Paper-Ruling Machines, of which the following is a specification.

This invention relates to paper-ruling machines, and more especially to that class thereof in which lines are ruled upon a continuous web of paper, and it has for one of its objects the provision of a machine of this character in which a plurality of such webs are independently operated upon and subsequently assembled and cut into sheets of predetermined length.

Our invention has, furthermore, for its object the provision of a ruling machine, in which the several webs are ruled on both sides, and in such a manner that the work performed by the ruling devices may be inspected or altered without in any way interfering with the running of the machine.

Our invention has, furthermore, for its object the combination with multiple-web ruling machine and its sheet-cutting mechanism of a mechanism for piling the cut sheets in a distinctive manner whereby the operator is enabled to take off a predetermined number of sheets without the necessity of counting them.

A further object of the invention resides in the improved construction of the transferring mechanism whereby the sheets are taken from the cutter and piled up in proper form for removal.

A further object of the invention is the provision of a machine which may be operated at a reduced rate of speed, so as to perform high-grade work, but which will turn out a large quantity of work in a given time and in a more desirable condition than prior similar machines.

The machine illustrated in the accompanying drawings is constructed so as to rule both sides of each of a plural number of paper webs, as they are drawn from the rolls and fed, in assembled condition, to a cutter which cuts the assembled webs simultaneously into sheets of the required length and delivers the latter to a mechanism which counts, and piles together, the desired number of sheets in condition to be removed without mixing the count.

Our invention has been clearly illustrated in the accompanying drawings, in which similar characters denote similar parts, and in which Figure 1 is a diagrammatic side view of the machine, showing the general location, organization, and connections of the mechanisms. Fig. 2 is an end view of the device for guiding and tensioning the web. Fig. 3 is a side view thereof, partially in section. Fig. 4 shows a side view of one of the ruling sections of the machine, and the cutting mechanism coöperative therewith. Fig. 5 represents a side view of the sheet counting and piling mechanism. Fig. 6 is a top view of the counting mechanism. Fig. 7 is an end view thereof. Fig. 8 shows a detail of the mechanism for moving the platform, vertically, on line 8 of Fig. 5. Fig. 9 is a side view of the grasping jaws or grippers of the piling mechanism. Fig. 10 shows a side view of the mechanism for opening the jaws, adjacent to the cutter. Fig. 11 represents a side view of the jaw-opening mechanism at the delivery-end of the machine, and Fig. 12 illustrates the manner in which the sheets are piled to preserve the count.

The general organization of our improved machine is clearly shown in Fig. 1, in which $W'$, $W^2$, $W^3$, denote a series of rolls of paper, the arbors 20 of which are supported for free rotation in bearings 21 (see Fig. 4) adjustably held on standards 22 provided on each side of the machine. Each web is unwound from the roll by a pair of coöperative feed-rolls 23, 24, in order to relieve the mechanism (whereby all the webs are simultaneously advanced) from excessive strain, and also to provide a certain amount of slack in each web preparatory to its engagement with the guiding and tensioning mechanism.

The feed rolls 23, 24 are journaled in suitable bearings provided therefor on brackets 25 on the side frames F, and each of the lower feed rolls 23 is provided at one end with a bevel gear 26 in engagement with a similar gear 27 secured to the lower end of a vertically-disposed shaft 28, which is journaled in bearings 29, 30 secured to the frame. At their upper ends the several shafts 28 carry bevel gears 31, which are engaged by similar gears 32 secured to a horizontally-disposed shaft 33 which is journaled in bearings 34 on the frame-rail F′, and which constitutes an actuator whereby all of the several feed-rolls are positively driven at a uniform circumferential speed, the rotation of the shaft 33 being directly controlled from a web-advancing or gathering roll to be hereinafter described.

After leaving the feed rolls, the web is permitted to fall in a loose loop, as at *w*, preparatory to its being engaged by a device whereby the web is properly guided to the ruling mechanism so that the lines ruled on the web will be practically uniformly distanced from the web-edge, and, in order to render this web-guiding device efficient, means are provided firstly for "flattening" the web so as to bring its opposite edges into contact with the guiding devices proper, and secondly for tensioning the flattened web to some extent, this tensioning means serving at the same time to hold the web in frictional engagement with the flattening means. This flattening and guiding device is clearly shown in Fig. 3, in which 35 denotes a rod which is held normally stationary in brackets 36 secured on the machine frames. Mounted for rotation on the rod 35, are a pair of rollers 37, 38 provided with helical ribs 39 for flattening or spreading the paper between the guiding devices, illustrated herein as disks 40, 41 secured to the rod 35, and adjustable thereon relatively to each other to accommodate different widths of paper. The web travels around a bar 42 held in the disk 40 and resting with its other end in an aperture provided therefor in the disk 41. From the foregoing it will be understood that the position of the bar controls the circumferential contact of the web with the flattening rolls, and also the tension of the web at this point.

In order to secure a proper tension of the web preparatory to its being operated upon by the ruling devices, we preferably employ a device indicated in a general way by T, and comprising a series of rods 45 (see Fig. 4) the ends of which are supported by "lazy-tongs" 46 whereby the spaces between the rods, and consequently the travel of the web, may be adjusted as required, the tongs being in the present instance, secured with their upper ends to the side frames, while their lower ends may be adjusted to suit the quality of paper passing through the machine.

After passing the tensioning device, the web is subjected to the action of the ruling mechanism, which in the present instance comprises two sets of devices successively operative on the opposite sides of the web, respectively. While the particular means for ruling the web may be of any desired construction, we have shown in the drawings the ordinary pens 50, 51 which rule the web as it is drawn over rollers 52, 53 and subsequently passes over idlers 54 journaled in bearings supported by the frame F′ which is disposed at such distance from the floor as to afford room for the operator to pass back and forth for the purpose of inspecting the work, to make such adjustments as may be necessary, and also to place fresh web-rolls into the machine, the several vertical frame sections being spaced relatively to each other by the frame F′ to form passage-ways P.

Referring to Fig. 1, it will be seen that all of the several webs are passing over the rolls 54 and thence travel together and in unison to the web-advancing or feeding mechanism which in the present instance comprises a gathering roller or cylinder 55 which may be driven by any suitable means and is supported in bearings 56 on top of the frame for the cutter mechanism. The shaft 57 of cylinder 55 carries a bevel gear 58 meshing with a bevel pinion 59 secured on a shaft 60 the other end of which is connected by a universal-joint 61 with the horizontal shaft 33, so that the circumferential speeds of the feed cylinder 55 and the web-pulling rollers 23 will be uniform. The several webs are held in close frictional contact with the cylinder 55 by means of spring-actuated rollers 62, and are then fed forward as a unit over an apron 63 to the cutting-off mechanism whereby the bunched webs are severed into sheets. This cutter mechanism comprises a stationary blade 65, and a revolving blade 66 which is mounted on a shaft 67. The sheets which are severed from the webs fall onto an endless apron 68 beneath a roll 69, and are thus passed to the counting and piling mechanism, (see Fig. 5), which is actuated directly from the cutting mechanism as follows: The cutter shaft 67 is journaled in bearings 70, and carries a bevel gear 71 in engagement with a similar gear 72 secured at the upper end of a vertical shaft 73 which is journaled in bearings 74 and has at its lower end a bevel gear 75 meshing with a similar gear 76 on a horizontal shaft 77 which constitutes the principal driving member of the counting and piling mechanism, and the speed of which is under constant control of the cutter movement.

The sheets are carried by the apron 68 to a transfer mechanism which grips the several bunches successively and deposits them on a platform, which is automatically lowered as the pile of sheets on its upper surface increases. The sheet-transferring mechanism comprises a lever 80 pivoted to the lower part of each side of the frame 81, and connected by a link 82 with a crank 83 secured upon a cross-shaft 84 which is journaled in a bracket 85 and carries a bevel gear 86 meshing with a similar gear 87 on the actuator-shaft 77 above mentioned.

The free ends of the levers 80 are connected by links 90, to slides 91, movable on ways 92 and rigidly secured to a transverse bar 93 which is provided with jaws adapted to be opened and closed for receiving and holding the bunches of sheets as they are delivered by the apron 68, and for drawing them upon the top of the platform which supports the piles. Two or more jaws 94 (see Fig. 9) are rigidly secured to said bar 93, and each carries a movable jaw 95. A spring-pressed plunger 96 serves to close the pivoted jaw 95 against its mate 94.

From the above description it will be understood that the bar 93 has a reciprocatory movement from one end of the machine to the other and controlled by the movement of the crank 83. In Fig. 5, the bar 93 is shown at its extreme movement toward the cutting mechanism, and the jaws (not here shown) have been opened to receive a pile of sheets from the apron 68 and subsequently closed. The particular manner in which the jaws are operated, can clearly be seen by a consideration of Figs. 9 and 10, where the movable jaw 95 is shown provided with a pin 97 which (during the final movement of the bar 93 toward the left) comes into engagement with the underside of an inclined blade 98 projecting laterally from a finger 99 which is pivoted at 100 to a stationary bar 101 and is held in its normal and active position by a spring 102. Hence it follows that, as the bar 93 moves toward the left, the pin will ride along on the underside of the blade 98 and finally slip over the end thereof, by virtue of the plunger 96, and thus grip the edges of the sheets. The return-movement of the bar 93 toward the right hand end of the machine will cause the pin 97 to ride over the inclined blade 98 which can yield to permit this movement, as will be readily understood. A similar action of the gripper 95 will take place during the final movement toward the delivery end of the machine, the jaw being opened to release the sheets, by a blade 103 on a finger 104 pivoted at 105 to a bar 106 and held in normal position by a spring 107.

As above stated, our invention has for one of its objects the provision of a mechanism whereby the cut sheets will be piled in a distinctive manner in order to enable the operator to take off a predetermined number of sheets without the necessity of counting them. We attain this result by organizing the sheet-releasing device so that it will open at different points of its travel, and therefore allow a bunch containing a certain number of sheets to overlap the preceding bunch.

In the present instance the bar 106 with the gripper-releasing fingers 104, is movable longitudinally of the machine, and its position is controlled by intermittently-actuated eccentrics 110 mounted on a shaft 111 and the rods of which are articulated to slides 112 for said bar, so that, when the eccentrics move the slides and bar forward, the fingers will open the grasping-jaws a little sooner than when the eccentrics draw the slides and bar backward. The eccentrics are rotated at predetermined intervals, or rather at the completion of a certain number of revolutions on the part of the cutter blade, so that the jaws are opened alternately in two different positions, and a desired number of sheets will be piled with their edges in one plane, and then the same number of sheets will be piled with their edges in another plane. This circumstance leaves the sheets piled in bunches of the desired number, with the edges of each alternate bunch overhanging as shown in Fig. 12, so that the bunches may be removed for further use without breaking the count. If there are five webs of paper, at each reciprocation of the jaws, five sheets are piled on the platform. If there are six webs of paper, at each reciprocation of the jaws six sheets are piled on the platform. The machine can be so adjusted that after a certain number of reciprocations of the jaws have piled the desired number of sheets in a bunch the jaw-opening fingers are moved, so that the same number will be piled in another bunch with their edges in a different plane. By means of this mechanism the bunches are piled with such number of sheets in each bunch as are required for some further use.

On the shaft 111 is a sprocket-wheel 113, and loose on a short shaft 114 on the inside of the frame is a sprocket-wheel 115. A chain 116 passes around these sprocket-wheels, Figs. 5, 6 and 7. The sprocket-wheel 115 is located between two friction-disks 116, which are splined on the shaft 114 and are squeezed together by a spring 117, (Fig. 7). When unlocked, the shaft 111 is rotated by the sprockets and chain driven by the friction-disks. On the shaft 114 is a beveled gear 118, meshing with a beveled gear 119 on a vertical shaft 120, which is driven from the horizontal shaft 77 by beveled gearing 121, Fig. 5. This mechanism rotates the friction-disks continuously.

Fastened on the shaft 111 is a locking-disk 122 having two bolt-notches 123. In a block 124, attached to the side of the frame, is a bolt 125. Extending outwardly from the lower end of this bolt is a pin 126, Figs. 5 and 7. On a notched disk 127 are a pair of plungers 128, which are forced outwardly by springs 129. One plunger-support is shown as screwed to the face of the disk, while the other is pivoted on the axis of the disk, so that it may be adjusted, Figs. 5 and 7. In each of the inner faces of these plungers is a mortise 126′, which when the plunger is brought into a vertical position receives the pin 126, which projects from the locking-bolt, so that by means of the pin and the mortise the plunger and bolt are joined together. When joined together, the depression of the plunger withdraws the bolt from a locking-notch and allows the shaft 111 to be rotated by the friction-disks and the sprockets and chain. When the bolt is in a locking-notch, said shaft is held against movement.

Pivoted to the side of the frame is a lever 130, one end of which is adapted to engage the upper ends of the plungers when they are in a vertical position and the other end of which is adapted to be engaged by the cam 131 on the shaft 114. At each rotation of the cam the lever is oscillated; but does not withdraw the bolt unless a plunger is in a vertical position and connected with the bolt.

Around the periphery of the disk 127 are notches 132, and pivoted on a bar 133, which is movable horizontally on the frame, is a double ratchet 134, which in different positions has its ends alternately in engagement with the notches of the disk. The stem 135 of the ratchet is connected to a rod 136, which passes through a block 137, mounted on a bracket 138, attached to the bar 133. On the rod is a spring 139, which thrusts between said block and a collar 140 on the rod and holds either one end or the other of the ratchet in engagement with the notches on the disk.

On the bar 133 is a roll 141 and a roll 142 in the path of the lever 80, which near one end of its stroke engages with the roll 141 and pushes the bar in one direction (toward the left) and near the other end of its stroke engages the roll 142 and pushes the bar in the opposite direction, Fig. 5. When one end of the ratchet is in engagement with the notches on the disk, the disk and the locking-bolt plungers are fed intermittently in one direction, and when the other end of the ratchet is in engagement with the notches the disk and locking-bolt plungers are fed in the opposite direction by the oscillations of the lever 80 and the reciprocations of the bar 133. By this means a certain number of reciprocations of the lever 80 and the grasping-jaws are made before one of the plungers gets in position to engage a locking-bolt, so that the locking-bolt will be released and will allow the shaft 111 to be rotated to change the position of the opening-fingers at the discharge end of the machine.

On the shaft 111 is a cam 143, in engagement with rolls on the end of a yoke 144 pivoted to the frame. Attached to the yoke-arms 145 are wires 146, that pass through a guide-bar 147 and have their lower ends located adjacent to pins 148, projecting from the ends of the ratchet 134. At each rotation of the shaft 111 the cam oscillates the yoke, which by means of the wires oscillates the ratchet, so that one end is disengaged and the other end is engaged with the notches on the periphery of the disk for the purpose of changing the direction of feed, Fig. 5. When the shaft 111 is turned, the position of the jaw-opening fingers is changed, and then the ratchet is changed, so that the index-disk will be fed in the opposite direction. One of the locking-bolt plungers is fixed with relation to the disk, while the other is adjustable about the disk, so that the number of intermittent steps which may be given to the disk may be varied. By reason of this any desired number of sheets may be piled in a bunch before the position of the opening jaws is changed to pile the succeeding sheets with their edges in another plane. The sheets are piled on a platform 149, supported by lugs 150 on blocks 151 (see Figs. 5 and 8) which are movable up and down each side of the frame by the rotation of screws 152. On the lower end of each screw 152 is a bevel-gear 153, meshing with a beveled gear 154, on a shaft 155, which extends across the machine and has a pinion 156, which meshes with a gear 157, fastened to a worm-gear 158, driven by a worm 159 on a shaft 160, which has a cone-pulley 161, around which passes a belt from a cone-pulley 162 on the shaft 77. One end of the shaft 160 is supported by a box 163, pivoted to the frame, while the other end is supported by a box 164, pivoted to a lever 165, which is held against movement by a link 166, and a stationary pin 166′, so that when this lever is in one position, the worm is engaged with the worm-wheel, and when the lever is in another position the worm is disengaged from the worm-wheel, Fig. 5. By means of the worms and gears the platform is lowered, the speed of the movement being varied by shifting the belt upon the cone-pulleys to allow for paper of different thicknesses. When the worm is disengaged from the worm-wheel, the platform may be raised quickly. If five or six webs are being ruled on both sides and fed together past the cutter, at each reciprocation of the grasping-jaws a number of sheets corresponding to the number of webs are drawn onto the platform. The number of reciprocations of the grasping-jaws before the position of the opening-fingers is changed determines the number of sheets which are placed in a pile before they are changed, so that the edges are in a different plane. If five webs are used, five sheets are laid out each time, and if there are five reciprocations of the grasping-jaws before the positions of the opening-fingers are changed, twenty-five sheets will be deposited in each overlaid bunch. The number of sheets drawn out each time depends upon the number of webs which are ruled at once, and the number of sheets laid with their edges in the same plane is only limited by the number of notches in the index-disk.

Our improved machine may be run slowly, so that the ruling will be accomplished satisfactorily, the cutting will be accurate, and the piling will be true, yet a large quantity of work is turned out in a given time. With this manner of piling the sheets the count is preserved and the operator merely picks up the bunches by the overlaid edges and counts the overlays and immediately calculates the number of sheets from the number of overlays.

If six webs are ruled at the same time, six sheets are severed at each movement of the cutter and left in proper condition to be immediately folded or transferred to some other machine and folded. Of course the plural number of webs from the inking mechanism may be carried to a rewinding-roll and from the rewinding-roll delivered to the cutter or to a folder, or of course the plural number of webs could be delivered immediately to a folding mechanism and then cut after having been folded. If six webs (ruled in this manner) should be delivered to a folding mechanism and then cut on one edge, the desired number of sheets for use in making up books or packages of writing-paper, are bunched ready for use. With this machine a plural number of sheets of paper are delivered at each reciprocation of the grasping-jaws, and yet the machine may be run as slowly as if only one sheet were being delivered at each time; but of course the speed of the machine is determined by the quality of paper being ruled.

This machine is particularly adapted for ruling paper which is to be used for forming tablets, for note-paper, ream-goods, composition-books, or any books which require any predetermined number of sheets, but which usually are made of signatures containing six or a multiple of six sheets.

We claim:

1. A machine for ruling paper having a frame, a plural number of supports adapted to hold rolls of paper, feed-rolls adjacent to each support for drawing the web of paper from each roll, a guide and tension device for controlling each web after it has been drawn out by the feed-rolls, a pair of idle pen-rolls over and under which each web passes from a guide and tension device, ink-ruling means adjacent to each pen-roll, means for leading all of the webs together, and a single feed mechanism for drawing all of the webs as one piece after they have been led together, substantially as specified.

2. A machine for ruling paper having a frame, a plural number of supports adapted to hold rolls of paper, feed-rolls adjacent to each support for drawing the web of paper from each roll, a guide and tension device for controlling each web after it has been drawn out by the feed-rolls, a pair of idle pen-rolls over and under which each passes from a guide and tension device, ink-ruling pens adjacent to each pen-roll, means for leading all of the webs together, and a single feed mechanism for drawing all of the webs as one piece after they have been led together, substantially as specified.

3. A machine for ruling paper having a frame, a plural number of supports adapted to hold rolls of paper, feed-rolls adjacent to each support for drawing the web of paper from each roll, a guide and tension device for controlling each web after it has been drawn out by the feed-rolls, a pair of idle pen-rolls over and under which each web passes from a guide and tension device, ink-ruling means adjacent to each pen-roll, means for leading all of the webs together, a single feed mechanism for drawing all of the webs as one piece after they have been led together, and a cutter for severing all of the webs simultaneously, substantially as specified.

4. A machine for ruling paper having a frame, a plural number of supports adapted to hold rolls of paper, feed-rolls adjacent to each support for drawing the web of paper from each roll, a guide and tension device for controlling each web after it has been drawn out by the feed-rolls, a pair of idle pen-rolls over and under which each web passes from a guide and tension device, ink-ruling means adjacent to each pen-roll, means for leading all of the webs together, a single feed mechanism for drawing all of the webs as one piece after they have been led together, a cutter for severing all of the webs simultaneously and an apron for delivering the sheets severed by the cutter, substantially as specified.

5. A machine for ruling paper having a frame, a plural number of supports adapted to hold rolls of paper, feed-rolls adjacent to each support for drawing the web of paper from each roll, a guide and tension device for controlling each web after it has been drawn out by the feed-rolls, a pair of idle pen-rolls over and under which each web passes from a guide and tension device, ink-ruling means adjacent to each pen-roll, means for leading all of the webs together, a single feed mechanism for drawing all of the webs as one piece after they have been led together, a cutter for severing all of the webs simultaneously, and mechanism for piling the severed sheets, substantially as specified.

6. A machine for ruling paper having a frame, a plural number of supports adapted to hold rolls of paper, a plural number of feeds for drawing the webs of paper from the rolls, a plural number of web-guides and tension devices, a plural number of ink-ruling devices, a feed for drawing all of the webs together as one piece from the inking devices, a cutter for severing all of the webs simultaneously, and mechanism for feeding a predetermined number of sheets alternately different distances so that the front edges of the alternate number of sheets overlap the front edges of the other sheets, substantially as specified.

7. A machine for ruling paper having a frame, paper-roll supports, web-feeding, guiding, tension and ink-ruling devices, a cutter for severing the webs into sheets, and mechanism for feeding a predetermined number of cut sheets alternately different distances so that the front edges of the alternate number of sheets overlap the front edges of the other sheets, substantially as specified.

8. A machine for ruling paper having a frame, paper-roll supports, web-feeding, guiding, tension and ink-ruling devices, a cutter for severing the webs into sheets, mechanism for feeding a predetermined number of cut sheets alternately different distances so that the front edges of the alternate number of sheets overlap the front edges of the other sheets, a platform for holding the sheets, and means for raising and lowering platform, substantially as specified.

9. A machine for ruling paper having a frame, paper-roll supports, web-feeding, guiding, tension and ink-ruling devices, a cutter for severing the webs into sheets, mechanism for feeding a predetermined number of cut sheets alternately different distances so that the front edges of the alternate number of sheets overlap the front edges of the other sheets, a platform for holding the sheets, and means connected with the cutter-operating mechanism for raising and lowering the platform, substantially as specified.

10. A machine for ruling paper having a frame, roll-supports, web-feeding, guiding, tension and inking devices, a cutter for severing the web into sheets, reciprocating jaws for grasping and piling the sheets delivered from the cutter, and means for opening the jaws in different planes, substantially as specified.

11. A machine for ruling paper having a frame, a plural number of roll-supports, a plural number of feeds for drawing the webs from the rolls, a plural number of adjustable guides and tension devices with rotatory sleeves having spiral guiding-ribs, a plural number of inking devices, a feed for drawing all of the webs together from the inking devices, and a cutter for severing all of the webs simultaneously, substantially as specified.

12. A machine for ruling paper having a frame, a plural number of supports adapted to hold rolls of paper, a guide and tension device for controlling each web of paper after it has been unwound from a roll, a pair of idle pen-rolls over and under which each web passes from a guide and tension device, ink-ruling means adjacent to each pen-roll, means for leading all of the webs together, and a single feed mechanism for drawing all of the webs as one piece after they have been led together, substantially as specified.

13. A machine for ruling paper having a frame, a plural number of supports adapted to hold rolls of paper, a guide and tension device for controlling each web of paper after it has been unwound from a roll, a pair of idle pen-rolls over and under which each web passes from a guide and tension device, ink-ruling means adjacent to each pen-roll, means for leading all of the webs together, a single feed mechanism for drawing all of the webs as one piece after they have been led together, a cutter for severing all of the webs simultaneously, and reciprocating jaws for grasping and piling sheets delivered from the cutter, substantially as specified.

14. A machine for ruling paper having a frame, a plural number of roll-supports, a plural number of web-guides and tension devices, a plural number of inking devices, a feed for drawing all of the webs together from the inking devices, a cutter for severing all of the webs simultaneously, reciprocating jaws for grasping and piling the sheets delivered from the cutter, and means for opening the jaws in different planes, substantially as specified.

15. A machine for ruling paper having a frame, a plural number of supports adapted to hold rolls of paper, a plural number of feeds for drawing the webs of paper from the rolls, a plural number of web-guides and tension devices, a plural number of ink-ruling devices, means for leading all of the webs together, a single feed mechanism for drawing all of the webs as one piece after they have been led together, a cutter for severing all of the webs simultaneously, means for driving the single feed mechanism, and shafts and gearing connecting the single feed mechanism with each of the roll-feeds, substantially as specified.

16. A machine for ruling paper having a frame, a plural number of supports adapted to hold rolls of paper, a plural number of feeds for drawing the webs of paper from the rolls, a plural number of web-guides and tension devices, a plural number of ink-ruling devices, means for leading all of the webs together, a single feed mechanism for drawing all of the webs as one piece after they have been led together, means for driving the single feed mechanism, shafts and gearing connecting the single feed mechanism with each of the roll-feeds, a cutter for severing all of the webs simultaneously, mechanism for piling the cut sheets delivered from the cutter, means for operating the cutter, and shafts and gearing connecting the cutter mechanism and the piling mechanism, substantially as specified.

17. A machine for ruling paper having a frame, a plural number of roll-supports, a plural number of feeds for drawing the webs from the rolls, a plural number of web-guides and tension devices, a plural number of inking devices, a feed for drawing all of the webs together from the inking devices, shafts and gearing connecting the feeds, a cutter, reciprocating jaws for grasping and piling the sheets delivered from the cutter, means for opening the jaws, shafts and gearing connecting the cutter and the jaw-operating mechanisms, and adjustable mechanism connected with the cutter mechanism for moving the jaw-opening means, substantially as specified.

18. In a ruling machine, the combination, with a plurality of web-roll supports, web-ruling devices and idle means coöperative with the ruling devices and for supporting the webs for engagement therewith, of independent tensioning devices for controlling the several webs, respectively, a single feed mechanism for assembling and drawing all of the several webs over said supports past their respective ruling devices, and a mechanism for separating the assembled webs into sheet bunches.

19. In a ruling machine, the combination with a plurality of web-roll supports, and ruling devices each comprising a series of line-producing members and an idle web-supporting member coöperative therewith, of means for tensioning each web prior to its engagement with its ruling device, a single feed mechanism for assembling and drawing all of the several webs over said supports past their respective ruling devices, and a mechanism for severing the assembled webs into sheet bunches.

20. In a ruling machine, the combination with a plurality of web-roll supports, and ruling devices each comprising a series of pens and an idle web-supporting roll coöperative therewith, of means for tensioning each web, individually, and prior to its passage around its supporting roll, a single feed mechanism for assembling and drawing all of the several webs past their respective ruling devices, and a mechanism for cutting the assembled webs simultaneously into separate sheet bunches.

21. In a ruling machine, the combination with a plurality of frame sections disposed to form passage-ways, each section comprising a web-support and a ruling mechanism, of means for guiding said webs clear of said passage-ways, and means for advancing all of said webs simultaneously.

22. In a ruling machine, the combination with a plurality of frame sections, each section comprising a web-support and ruling mechanism, and means for spacing the several sections relatively to each other, of rollers supported on said spacing means and for guiding said webs, and means for advancing all of said webs simultaneously.

23. In a ruling machine, the combination with a plurality of frame-sections each section comprising a web-support, and ruling mechanism, of frame-bars disposed near the tops of said sections and for spacing the same relatively to each other to form passage-ways, rollers supported on said frame-bars and for guiding the web clear of said passage-ways, a feed mechanism for advancing all of the webs, and a cutting mechanism for severing the webs into sheets.

24. In a ruling machine, the combination, with a plurality of web-roll supports, ruling devices for the several webs, and an idle web-supporting roll coöperative with each of said devices, of means for tensioning each web prior to its engagement therewith, a single feed-mechanism comprising a pair of coöperative rollers for feeding all of the several webs collectively and as a unit and for drawing the same, individually, past their respective ruling-devices, and a mechanism for subsequently acting upon the assembled webs.

25. In a ruling machine, the combination, with a plurality of web-roll supports, a pair of devices, successively-operative on and for ruling the opposite sides of each web, and a pair of idle supports for each web and coöperative with said ruling-devices, of a device for tensioning each web on both of its idle supports, a single feed-mechanism for assembling and drawing all of the several webs forward over their supports and past their respective ruling-devices, and a mechanism for subsequently acting upon the assembled webs.

CHARLES F. TAYLOR.
GEORGE M. McCLELLAN.

Witnesses:
D. C. HELGREN,
CHAS. F. SCHMELZ.